P. G. BENNETT.
CASE FOR UNIVERSAL JOINTS.
APPLICATION FILED MAY 11, 1917.

1,293,311.

Patented Feb. 4, 1919.

Inventor
PAUL G. BENNETT.

Witness

By

Attorney

UNITED STATES PATENT OFFICE.

PAUL G. BENNETT, OF WILKES-BARRE, PENNSYLVANIA, ASSIGNOR TO SPICER MFG. CORPORATION, OF SOUTH PLAINFIELD, NEW JERSEY, A CORPORATION OF VIRGINIA.

CASE FOR UNIVERSAL JOINTS.

1,293,311.  Specification of Letters Patent.  Patented Feb. 4, 1919.

Application filed May 11, 1917. Serial No. 167,853.

*To all whom it may concern:*

Be it known that I, PAUL G. BENNETT, a citizen of the United States, residing at Wilkes-Barre, county of Luzerne, State of Pennsylvania, have invented a certain new and useful Improvement in Cases for Universal Joints, and declare the following to be a full, clear, and exact description of the same, such as will enable others skilled in the art to which it pertains to make and use the same, reference being had to the accompanying drawings, which form a part of this specification.

This invention relates to a case for universal joints and its object is a universal joint so constructed in relation to a transmission case or other oil reservoir as to prevent leakage of oil therefrom. Another object of the invention is a universal joint which is automatically oiled by the leakage from the transmission case. These and other objects and the several novel features of the invention in its preferred form are hereinafter more fully described and claimed and shown in the accompanying drawings in which—

Similar characters refer to similar parts throughout the drawings and specification.

Figure 1:
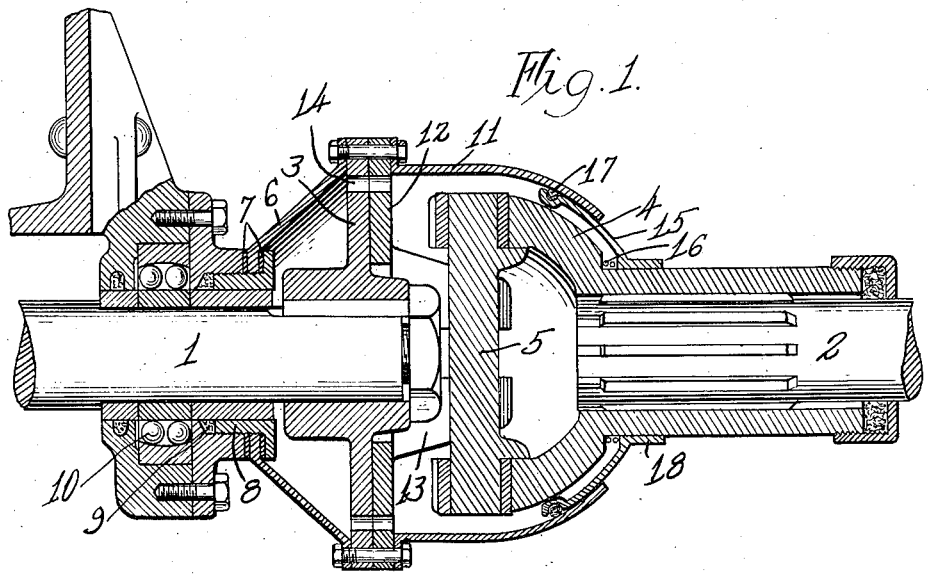
Figure 1 is a longitudinal section of the universal joint showing part of the transmission case contiguous thereto.
Figure 3:
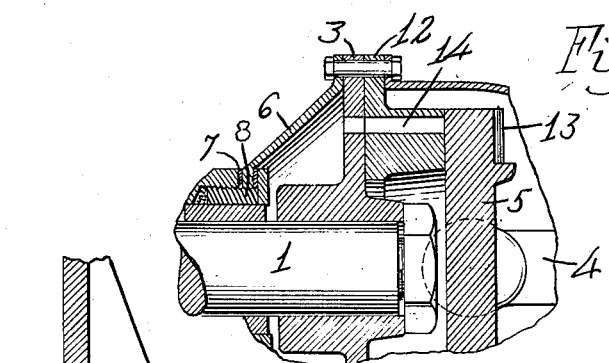
Fig. 3 is a section of the universal joint taken at a right angle to Fig. 1.
Figure 2:
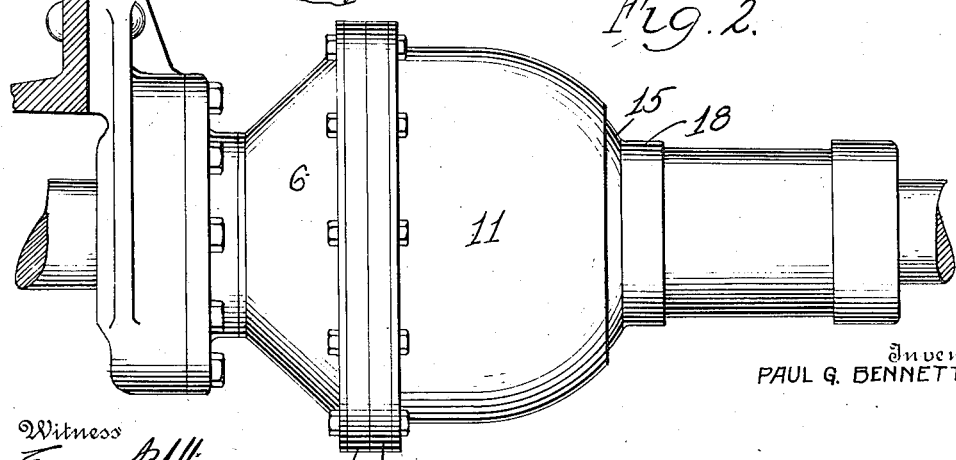
Fig. 2 is an elevation of the universal joint.

As is usual in this type of device a main drive shaft 1 is provided which extends through the transmission case or oil receptacle and is keyed to a flange 3. The propeller shaft 2 as shown more particularly in Fig. 1 is keyed to the part 4 of the universal joint which in turn is pivoted to the part 5 of the joint, the part 5 of the joint being pivoted to the flange 3. A cone shaped oil guard 6 is provided bolted to the flange 3 on the outer edge thereof, the inner edge of the guard 6 being flanged inwardly and provided with a packing 7 on each side thereof and adapted to be held tightly in place by the gland 8 which binds against the packing 7 and 9 when drawn up and, as is shown in Fig. 1 the transmission case is provided with ball bearings 10 about the shaft 1.

A cup shaped plate 11 is provided as in the well known types of universal joints and is bolted to the flanges 12 and 3, the flanges 12 and 3 being apertured at 14 about the circumference thereof for a purpose hereinafter stated. As will be noted more particularly in Fig. 1 the plate 15 is provided with a flange 18 which fits about the part 4 of the universal joint and a spring 16 tends to hold the packing 17 in engagement with the cup shaped plate 11 and by this tension of the spring 16, it can be seen the packing 17 will tightly contact the cup shaped plate 11 at different positions of the propeller shaft 2.

In the common type of universal joint the oil from the transmission works along the shaft 1 and thus leaks out of the transmission case as may be seen on the under side of the floor boards of an automobile which becomes spattered with oil. The object of this invention is to prevent this waste of oil and use it to automatically oil the universal joint by the oil working along the shaft 1, until it passes into the interior of the joint. In this device the oil in working along the shaft 1 passes the gland 8 and is thrown outward by centrifugal force and thus contacts the sides of the guard plate 6 and is forced along the sides of the plate 6 to the apertures 14. Upon passing through the apertures 14 the oil will tend to collect on the moving parts of the joint and thus oil it. To prevent leakage of oil the packing 7 is provided about the flange on the plate 6 and the packing 17 is also provided on the inside of the joint to prevent leakage of the oil by centrifugal force which might take place if the plate 15 and packing 17 were placed on the outside of part 11 as is the common practice.

Thus it can be seen that this type of universal joint prevents oil waste and uses the oil that would naturally be wasted to lubricate the joint.

From the foregoing description it becomes evident that the device, while of a simple nature, is very efficient in operation and that by adding the plate 6, the nut 8 and contiguous packings and by boring the holes 14 in the respective plates the common types of universal joints may be made self-lubricating and thus prevent wastage of oil.

Having thus briefly described my invention, its utility and mode of operation what

I claim and desire to secure by Letters Patent of the United States is—

1. In a device of the character described, the combination with a shaft, and a bearing therefor adapted to be supplied with oil, of a universal joint structure secured to said shaft and comprising a laterally projecting member mounted on said shaft and having an oil passage through it, and a casing inclosing the space between said laterally projecting member and said bearing, whereby oil escaping from the bearing is caused to pass through said oil passage into the universal joint structure.

2. In a device of the character described, the combination with a shaft, and a bearing therefor adapted to be supplied with oil, of a universal joint structure secured to said shaft and comprising a laterally projecting member mounted on said shaft and having an oil passage through it, and a casing inclosing the space between said laterally projecting member and said bearing and carried by and rotating with the universal joint, said casing arranged to confine oil escaping from said bearing and to cause such oil to pass through said oil passage into the universal joint structure.

3. In a device of the character described, the combination with a shaft, and a bearing therefor adapted to be supplied with oil and a packing arrangement comprising a gland, of a universal joint structure secured to said shaft and comprising a laterally projecting member mounted on said shaft and having an oil passage through it, and a casing inclosing the space between said laterally projecting member and said bearing and at one end secured to the universal joint and at the other end embracing the gland, said casing arranged to confine oil escaping from said bearing and to cause such oil to pass through said oil passage into the universal joint structure.

4. In a device of the character described, in combination with a shaft, a bearing therefor, a gland about the shaft having a flange thereon, a universal joint, a casing secured thereto, a flange at one end of the casing adapted to fit between the flanged gland and the bearing and packing about the flange on the casing to prevent leakage of oil therefrom, the casing providing a means for conveying oil from the bearing to the joint.

5. In a device of the character described, in combination with a shaft, a bearing therefor arranged to be supplied with oil, a universal joint having one member attached to the projecting end of the shaft, said member being provided with a flange, a two-part casing inclosing the joint, the two parts being secured to opposite sides of and near the periphery of the flange, one part extending toward and inclosing the end of the bearing for the shaft, the other part inclosing the joint, the flange being apertured to allow oil to pass from the compartment on one side of the flange into the compartment in which the joint is located.

In testimony whereof I sign this specification.

PAUL G. BENNETT.